(12) United States Patent
Chen et al.

(10) Patent No.: US 12,732,223 B2
(45) Date of Patent: Sep. 8, 2026

(54) RADIO FREQUENCY FRONT-END CIRCUIT OF WIRELESS COMMUNICATION DEVICE

(71) Applicant: MEDIATEK INC., Hsin-Chu (TW)

(72) Inventors: Tsung-Ming Chen, Hsinchu City (TW); Wei-Kai Hong, Hsinchu City (TW); Ting-Wei Liang, Hsinchu City (TW); Wei-Pang Chao, Hsinchu City (TW); Po-Yu Chang, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 308 days.

(21) Appl. No.: 18/404,766

(22) Filed: Jan. 4, 2024

(65) Prior Publication Data

US 2024/0243769 A1 Jul. 18, 2024

Related U.S. Application Data

(60) Provisional application No. 63/439,159, filed on Jan. 16, 2023.

(51) Int. Cl.
*H04B 1/40* (2015.01)
*H04B 1/00* (2006.01)

(52) U.S. Cl.
CPC ............. *H04B 1/40* (2013.01); *H04B 1/0096* (2013.01)

(58) Field of Classification Search
CPC ...... H04B 1/40; H04B 1/0096; H04B 1/0483; H04B 1/406
See application file for complete search history.

(56) References Cited

U.S. PATENT DOCUMENTS

| | | | |
|---|---|---|---|
| 10,574,287 B1 | 2/2020 | Thoppay Egambaram | |
| 2016/0072456 A1 | 3/2016 | Lin | |
| 2017/0366146 A1* | 12/2017 | Trotskovsky | H03F 1/223 |
| 2022/0376731 A1 | 11/2022 | Li | |

* cited by examiner

*Primary Examiner* — Nicholas Pachol
(74) *Attorney, Agent, or Firm* — Winston Hsu

(57) ABSTRACT

A radio frequency (RF) front-end circuit of a wireless communication device is provided. The RF front-end circuit includes a receiving amplifier, a down-converter, an up-converter, a transmitting amplifier and an output driver, where the receiving amplifier and the down-converter are configured to process received signals according to a local oscillation (LO) signal, and the up-converter, the transmitting amplifier and the output driver are configured to process transmitted signals according to the LO signal. The receiving amplifier, the up-converter or the transmitting amplifier includes a transformer load. The transformer load includes a switchable inductor. When the wireless communication device operates in a first mode, the LO signal has a first frequency, and the switchable inductor has a first inductance. When the wireless communication device operates in a second mode, the LO signal has a second frequency, and the switchable inductor has a second inductance.

11 Claims, 4 Drawing Sheets

RADIO FREQUENCY FRONT-END CIRCUIT OF WIRELESS COMMUNICATION DEVICE

CROSS REFERENCE TO RELATED APPLICATIONS

This application claims the benefit of U.S. Provisional Application No. 63/439,159, filed on Jan. 16, 2023. The content of the application is incorporated herein by reference.

BACKGROUND

The present invention is related to multi-band communications devices, and more particularly, to a radio frequency (RF) front-end circuit of a wireless communication device (e.g. a multi-band transceiver, a multi-band transmitter or a multi-band receiver).

In comparison with Wi-Fi 6 standard, Wi-Fi 7 standard supports wider bandwidth, more operating channels, greater flexibility for channel bandwidth configurations and more complex modulation scheme. For a transceiver of a related art, different modes corresponding to different frequency bands are executed by different circuits. Based on this implementation, when a number of available frequency bands increases, hardware costs of enabling the transceiver to support these frequency bands greatly increases.

Thus, there is a need for a novel architecture of a transceiver, a transmitter or a receiver supporting multi-band applications, which can be implemented by less hardware costs in comparison with the related art.

SUMMARY

An objective of the present invention is to provide a radio frequency (RF) front-end circuit of a wireless communication device (e.g. a multi-band transceiver, a multi-band transmitter or a multi-band receiver), which can reduce required hardware costs as much as possible, to thereby solve the problem of the related art.

At least one embodiment of the present invention provides a RF front-end circuit of a wireless communication device. The RF front-end circuit comprises a receiving amplifier, a down-converter, an up-converter, a transmitting amplifier and an output driver, where the down-converter is coupled to the receiving amplifier, the transmitting amplifier is coupled to the up-converter, and the output driver is coupled to the transmitting amplifier. The receiving amplifier is configured to amplify a RF received signal to generate an amplified received signal. The down-converter is configured to down-convert the amplified received signal according to a local oscillation (LO) signal to generate a down-converted received signal. The up-converter is configured to up-convert a transmitted signal according to the LO signal to generate an up-converted transmitted signal. The transmitting amplifier is configured to amplify the up-converted transmitted signal to generate an amplified transmitted signal. The output driver is configured to output a driving transmitted signal according to the amplified transmitted signal. More particularly, at least one of the receiving amplifier, the up-converter and the transmitting amplifier comprises a transformer load, and the transformer load comprises a switchable inductor. When the wireless communication device is set to operate in a first mode, the LO signal is set to have a first frequency, and the switchable inductor is set to have a first inductance. When the wireless communication device is set to operate in a second mode, the LO signal is set to have a second frequency, and the switchable inductor is set to have a second inductance.

At least one embodiment of the present invention provides a RF front-end circuit of a wireless communication device. The RF front-end circuit comprises an up-converter, a transmitting amplifier and an output driver, where the transmitting amplifier is coupled to the up-converter, and the output driver is coupled to the transmitting amplifier. The up-converter is configured to up-convert a transmitted signal according to a LO signal to generate an up-converted transmitted signal. The transmitting amplifier is configured to amplify the up-converted transmitted signal to generate an amplified transmitted signal. The output driver is configured to output a driving transmitted signal according to the amplified transmitted signal. More particularly, at least one of the up-converter and the transmitting amplifier comprises a transformer load, and the transformer load comprises a switchable inductor. When the wireless communication device is set to operate in a first mode, the LO signal is set to have a first frequency, and the switchable inductor is set to have a first inductance. When the wireless communication device is set to operate in a second mode, the LO signal is set to have a second frequency, and the switchable inductor is set to have a second inductance.

At least one embodiment of the present invention provides a RF front-end circuit of a wireless communication device. The RF front-end circuit comprises a receiving amplifier and a down-converter, where the down-converter is coupled to the receiving amplifier. The receiving amplifier is configured to amplify a RF received signal to generate an amplified received signal. The down-converter is configured to down-convert the amplified received signal according to a LO signal to generate a down-converted received signal More particularly, the receiving amplifier comprises a transformer load, and the transformer load comprises a switchable inductor. When the wireless communication device is set to operate in a first mode, the LO signal is set to have a first frequency, and the switchable inductor is set to have a first inductance. When the wireless communication device is set to operate in a second mode, the LO signal is set to have a second frequency, and the switchable inductor is set to have a second inductance.

The RF front-end circuit provided by the embodiments of the present invention can make at least one inductor within the transformer load of the receiving amplifier (e.g. a low noise amplifier), the up-converter (e.g. a mixer for up-conversion) and the transmitting amplifier (e.g. a programmable gain amplifier) be switchable, thereby enabling the receiving amplifier, the up-converter and the transmitting amplifier be utilized in both a transmitting mode and a receiving mode. Thus, the transmitting mode and the receiving mode can share the hardware of the receiving amplifier, the up-converter and the transmitting amplifier.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
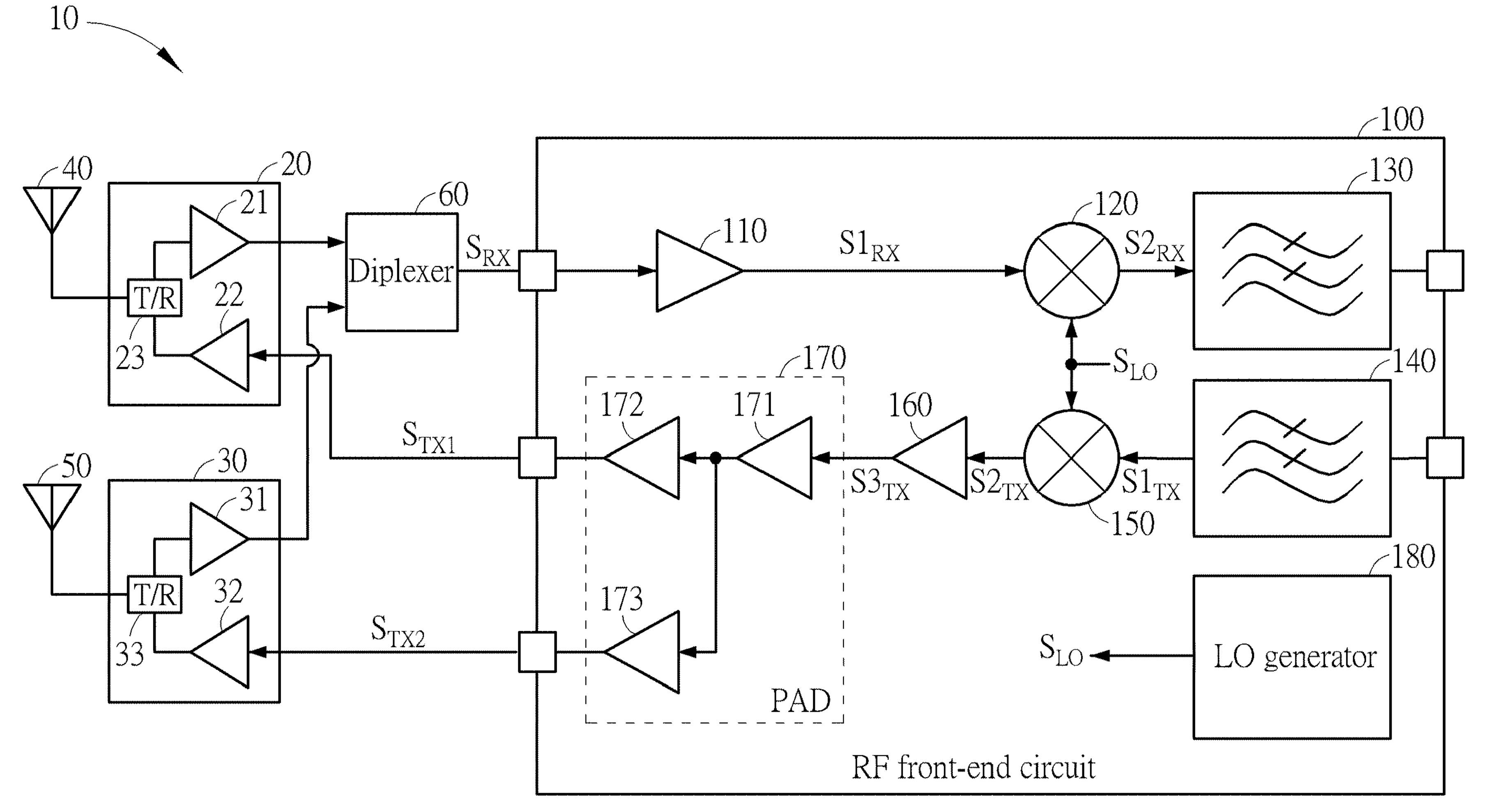
FIG. 1 is a diagram illustrating a wireless communication device according to an embodiment of the present invention.

FIG. 1 is a diagram illustrating a wireless communication device such as a multi-band transceiver 10 (e.g. a Wi-Fi transceiver) according to an embodiment of the present invention. As shown in FIG. 1, the multi-band transceiver 10 may comprise a radio frequency (RF) front-end circuit 100, external front-end modules (eFEMs) 20 and 30, antennas 40 and 50, and a diplexer 60. The eFEM 20 may comprise an external low noise amplifier (LNA) 21, an external power amplifier (PA) 22 and a transmitting/receiving (T/R) switch 23. The eFEM 30 may comprise an external LNA 31, an external PA 32 and a T/R switch 33. In this embodiment, the antenna 40 and the eFEM 20 may be configured to receive and transmit RF signals in a first frequency band such as a 2.4 gigahertz (GHz) frequency band, and the antenna 50 and the eFEM 30 may be configured to receive and transmit RF signals in a second frequency band such as a 5 GHz frequency band and a 6 GHz frequency band. When the multi-band transceiver 10 is set to operate in a first mode such as a 2.4 GHz mode, the diplexer 60 may select the RF signal received by the antenna 40 and the eFEM 20 to be transmitted to the RF front-end circuit 100. When the multi-band transceiver 10 is set to operate in a second mode such as a 5/6 GHz mode, the diplexer 60 may select the RF signal received by the antenna 50 and the eFEM 30 to be transmitted to the RF front-end circuit 100.

In this embodiment, the antenna 50 and the eFEM 30 support operations of handling the RF signals in both the 5 GHz frequency band and the 6 GHz frequency band, but the present invention is not limited thereto. In some embodiment, the RF signals in the 5 GHz frequency band and the RF signals in the 6 GHz frequency band may be handled by separated antennas and eFEMs and different modes (e.g. by a 5 G mode and a 6 G mode respectively). In addition, a number of sets of antennas and eFEMs and a number of modes for different frequency bands are not limited by the scheme shown in FIG. 1, where those skilled in this art should understand how to extend the number of sets of antennas and eFEMs and the number of modes for different frequency bands according to the scheme shown in FIG. 1.

In this embodiment, the RF front-end circuit 100 may comprises a receiving amplifier such as a LNA 110, a down-converter such as a down-converting mixer 120, a baseband circuit 130, a baseband circuit 140, an up-converter such as an up-converting mixer 150, a transmitting amplifier such as a programmable gain amplifier (PGA) 160, an output driver such as a PA driver (PAD) 170, and a local oscillation (LO) generator 180 (which may comprise a phase locked loop). As shown in FIG. 1, the down-converting mixer 120 is coupled to the LNA 110, the baseband circuit 130 is coupled to the down-converting mixer 120, the up-converting mixer 150 is coupled to the baseband circuit 140, the PGA 160 is coupled to the up-converting mixer 150, the PAD 170 is coupled to the PGA 160, and the LO generator 180 is coupled to the down-converting mixer 120 and the up-converting mixer 150.

In this embodiment, the LNA 110 is configured to amplify a RF received signal $S_{RX}$ from the diplexer 60 (e.g. the RF signal received by the antenna 40 and the eFEM 20 or the RF signal received by the antenna 50 and the eFEM 20) to generate an amplified received signal $S1_{RX}$. The down-converting mixer 120 is configured to down-convert the amplified received signal $S1_{RX}$ according to a LO signal $S_{LO}$ from the LO generator 180 to generate a down-converted received signal $S2_{RX}$. The baseband circuit 130 may perform some post-processing such as filtering upon the down-converted received signal $S2_{RX}$ for backend operations, but the present invention is not limited thereto. The up-converting mixer 150 is configured to up-convert a transmitted signal $S1_{TX}$ from the baseband circuit 140 according to the LO signal $S_{LO}$ to generate an up-converted transmitted signal $S2_{TX}$. The PGA 160 is configured to amplify the up-converted transmitted signal $S2_{TX}$ to generate an amplified transmitted signal $S3_{TX}$. The PAD 170 is configured to output a driving transmitted signal (e.g. a driving transmitted signal $S_{TX1}$ for driving the external PA 22 or a driving transmitted signal $S_{TX2}$ for driving the external PA 32) according to the amplified transmitted signal $S3_{TX}$.

In this embodiment, at least one of the LNA 110, the up-converting mixer 150 and the PGA 160 may comprise a transformer load, and the transformer load may comprise a switchable inductor. When the multi-band transceiver 10 is set to operate in the first mode (e.g. the 2.4 GHz mode), the LO signal $S_{LO}$ is set to have a first frequency, and the switchable inductor is set to have a first inductance. When the multi-band transceiver 10 is set to operate in the second mode (e.g. the 5/6 GHz mode), the LO signal $S_{LO}$ is set to have a second frequency (which is different from the first frequency), and the switchable inductor is set to have a second inductance (which is different from the first inductance). Detailed implementation of the transformer load and the switchable inductor therein will be described later.

In this embodiment, the PAD 170 may comprise a transconductance stage 171 and output stages 172 and 173, where both of the output stages 172 and 173 are coupled to the transconductance stage 171. The transconductance stage 171 is configured to receive the amplified transmitted signal $S3_{TX}$ from the PGA 160 and generate an output current according to the transmitted signal $S3_{TX}$. The output stage 172 is implemented according to requirements of the first mode, and is configured to output the driving transmitted signal $S_{TX1}$ according to the amplified transmitted signal $S3_{TX}$ (e.g. according to the output current from the transconductance stage 171) when the multi-band transceiver 10 is set to operate in the first mode. The output stage 173 is implemented according to requirements of the second mode, and is configured to output the driving transmitted signal $S_{TX2}$ according to the amplified transmitted signal $S3_{TX}$ (e.g. according to the output current from the transconductance stage 171) when the multi-band transceiver 10 is set to operate in the second mode. It should be noted that a number of output stages is not limited to that in this embodiment, where the number of output stages may vary according to the number of modes for different frequency bands, and each output stage may be implemented according to requirements of respective frequency bands.

The LNA 110, the down-converting mixer 120 and the baseband circuit 130 belong to a receiving path of the RF front-end circuit 100, and the baseband circuit 140, the up-converting mixer 150, the PGA 160 and the PAD 170 belong to a transmitting path of the RF front-end circuit 100. In this embodiment, both the receiving path and the transmitting path are implemented to enable the RF front-end circuit 100 be applicable to the multi-band transceiver. In some embodiment, the receiving path may be omitted, and the RF front-end circuit 100 without the receiving path is applicable to a multi-band transmitter, where at least one of the up-converting mixer 150 and the PGA 160 may comprise the transformer load mentioned above. In some embodiment, the transmitting path may be omitted, and the RF front-end circuit 100 without the transmitting path is applicable to a multi-band receiver, where the LNA 110 may comprise the transformer load mentioned above.

It should be noted that the present invention is aimed at mode switching of the LNA 110, the up-converting mixer 150, the PGA 160 and the PAD 170 when the multi-band transceiver 10 is set to operate in either the first mode or the second mode. Other implementation details of the multi-band transceiver 10 (e.g. the operations of the baseband circuits 130 and 140) that is unrelated to the mode switching mentioned above should be well known by those skilled in this art, and will not be described in detail here for brevity.

Figure 2:
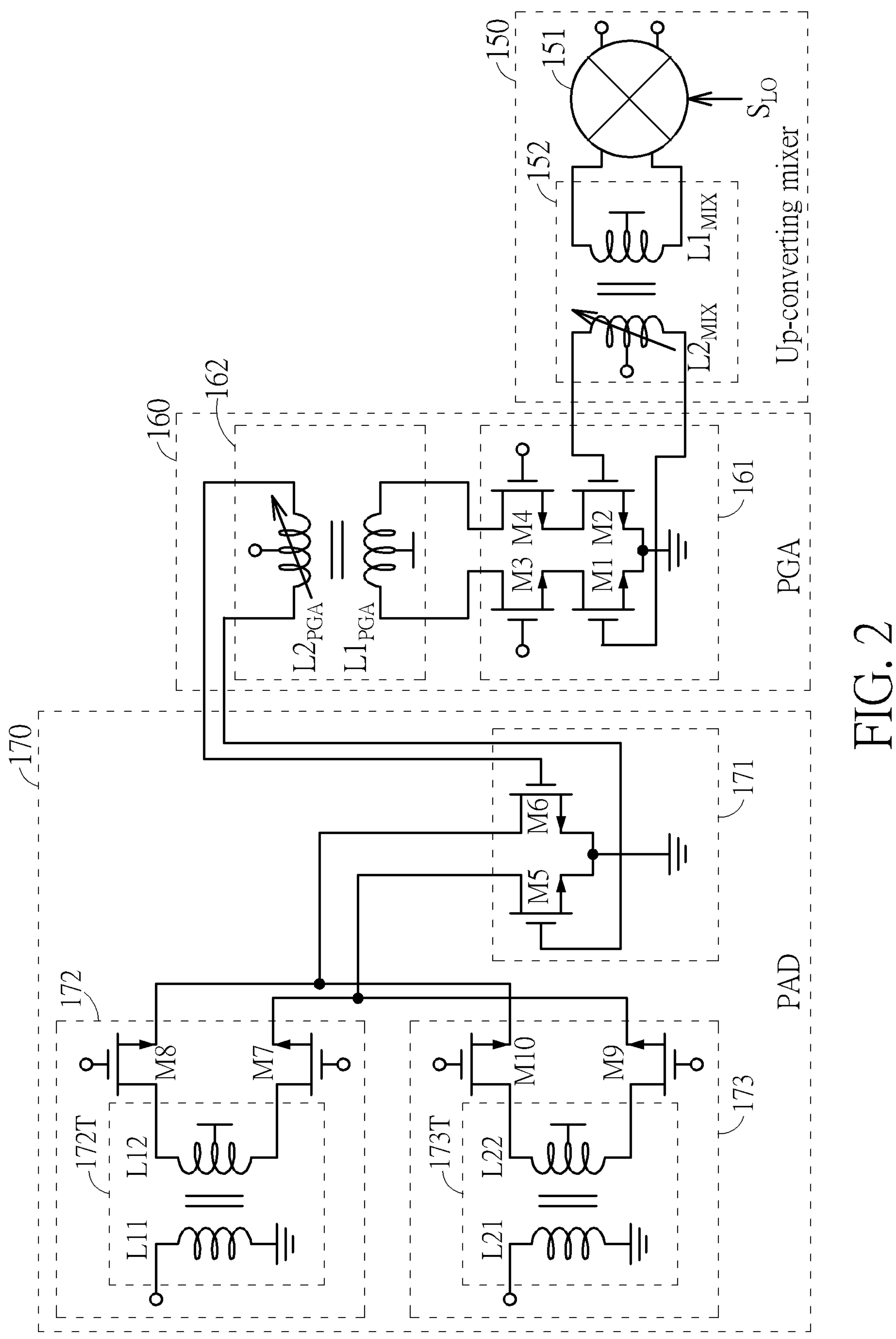
FIG. 2 is a diagram illustrating details of some subcircuits of a transmitting path of a radio frequency (RF) front-end circuit shown in FIG. 1 according to an embodiment of the present invention.

FIG. 2 is a diagram illustrating details of some sub-circuits (e.g. the up-converting mixer 150, the PGA 160 and the PAD 170) of the transmitting path of the multi-band transceiver 10 shown in FIG. 1 according to an embodiment of the present invention. As shown in FIG. 2, the up-converting mixer 150 may comprise an up-converting core circuit 151 and a transformer load 152 (which is configured to transform an output impedance of the up-converting mixer 150), where the transformer load 152 is coupled to output terminals of the up-converting core circuit 151. The transformer load 152 may comprise inductors $L1_{MIX}$ and $L2_{MIX}$, where the inductor $L1_{MIX}$ is coupled to the output terminals of the up-converting core circuit 151, and the inductor $L2_{MIX}$ is coupled to input terminals of the PGA 160. The inductors $L1_{MIX}$ and $L2_{MIX}$ may be routed concentrically. In this embodiment, the inductor $L2_{MIX}$ may represent the switchable inductor (e.g. the inductor $L1_{MIX}$ has a fixed inductance and the inductor $L2_{MIX}$ has a switchable inductance). In some embodiment, the inductor $L1_{MIX}$ may represent the switchable inductor (e.g. the inductor $L2_{MIX}$ has a fixed inductance and the inductor $L1_{MIX}$ has a switchable inductance).

In this embodiment, the PGA 160 may comprise an amplifier core circuit 161 and a transformer load 162 (which is configured to transform an output impedance of the PGA 160), where the transformer load 162 is coupled to output terminals of the amplifier core circuit 161. The amplifier core circuit 161 may comprise input transistors such as N-type transistors M1 and M2, and cascaded transistors such as N-type transistors M3 and M4, where gate electrodes of the N-type transistors M1 and M2 may be the input terminals of the PGA 160, and drain terminals of the N-type transistors M3 and M4 may be output terminals of the amplifier core circuit 161. The transformer load 162 may comprise inductors $L1_{PGA}$ and $L2_{PGA}$, where the inductor $L_{PGA}$ is coupled to the output terminals of the amplifier core circuit 161, and the inductor $L2_{PGA}$ is coupled to input terminals of the PAD 170. The inductors $L1_{PGA}$ and $L2_{PGA}$ may be routed concentrically. In this embodiment, the inductor $L2_{PGA}$ may represent the switchable inductor (e.g. the inductor $L1_{PGA}$ has a fixed inductance and the inductor $L2_{PGA}$ has a switchable inductance). In some embodiment, the inductor $L1_{PGA}$ may represent the switchable inductor (e.g. the inductor $L2_{PGA}$ has a fixed inductance and the inductor $L1_{PGA}$ has a switchable inductance).

In this embodiment, the transconductance stage 171 may comprise input transistors such as N-type transistors M5 and M6, where gate electrodes of the N-type transistors M5 and M6 may be the input terminals of the PAD 170. The output stage 172 may comprise cascaded transistors such as N-type transistors M7 and M8, and a transformer load 172T (which is configured to perform a single-to-differential transformation to output the driving transmitted signal $S_{TX1}$ shown in FIG. 1), where the transformer load 172T may comprise inductors L11 and L12 that are routed concentrically. In addition, the output stage 173 may comprise cascaded transistors such as N-type transistors M9 and M10, and a transformer load 173T (which is configured to perform a single-to-differential transformation to output the driving transmitted signal $S_{TX2}$ shown in FIG. 1), where the transformer load 173T may comprise inductors L21 and L22 that are routed concentrically.

Figure 3:
FIG. 3 is a diagram illustrating a transformer load having a switchable inductor according to an embodiment of the present invention.
Figure 3:
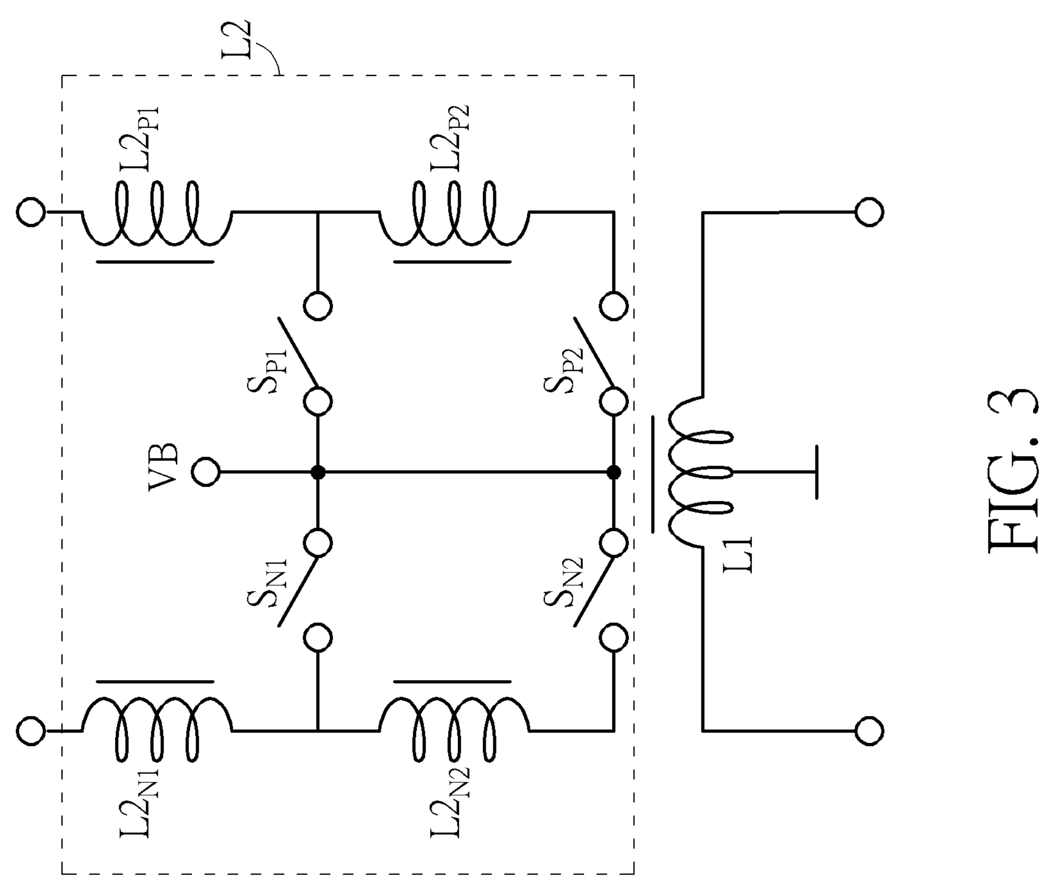

FIG. 3 is a diagram illustrating a transformer load 300 having a switchable inductor according to an embodiment of the present invention. In this embodiment, the transformer load 300 may comprise a fixed inductor such as an inductor L1 and the switchable inductor such as an inductor L2. The inductor L2 may comprise a first negative sub-inductor such as a sub-inductor $L2_{N1}$, a first positive sub-inductor such as a sub-inductor $L2_{P1}$, a second negative sub-inductor such as a sub-inductor $L2_{N2}$, a second positive sub-inductor such as a sub-inductor $L2_{P2}$, a first negative switch such as a switch $S_{N1}$, a first positive switch such as a switch $S_{P1}$, a second negative switch such as a switch $S_{N2}$, and a second positive switch such as a switch $S_{P2}$. A first end of the sub-inductor $L2_{N2}$ (e.g. an upper end thereof shown in FIG. 3) is coupled to a first end of the sub-inductor $L2_{N1}$ (e.g. a lower end thereof shown in FIG. 3), and a first end of the sub-inductor $L2_{P2}$ (e.g. an upper end thereof shown in FIG. 3) is coupled to a first end of the sub-inductor $L2_{P1}$ (e.g. a lower end thereof shown in FIG. 3). The switch $S_{N1}$ is coupled between the first end of the sub-inductor $L2_{N2}$ and a reference voltage VB, the switch $S_{P1}$ is coupled between the first end of the sub-inductor $L2_{P2}$ and the reference voltage VB, the switch $S_{N2}$ is coupled between a second end of the sub-inductor $L2_{N2}$ (e.g. a lower end thereof shown in FIG. 3) and the reference voltage VB, and the switch $S_{P2}$ is coupled between a second end of the sub-inductor $L2_{P2}$ (e.g. a lower end thereof shown in FIG. 3) and the reference voltage VB. When the multi-band transceiver 10 is set to operate in the first mode, the switches $S_{N1}$ and $S_{P1}$ are turned off, and the switches $S_{N2}$ and $S_{P2}$ are turned on, making $L2=L2_{N1}+L2_{N2}+L2_{P1}+L2_{P2}$. When the multi-band transceiver 10 is set to operate in the second mode, the switches $S_{N1}$ and $S_{P1}$ are turned on, and the switches $S_{N2}$ and $S_{P2}$ are turned off, making $L2=L2_{N1}+L2_{P1}$.

In one embodiment, the transformer load 152 shown in FIG. 2 may be implemented by the transformer load 300. For example, the inductor L1 may be coupled to the output terminals of the up-converting core circuit 151, and the inductor L2 may be coupled to the input terminals of the PGA 160 via a second end of the sub-inductor $L2_{N1}$ (e.g. an upper end thereof shown in FIG. 3) and a second end of the sub-inductor $L2_{P1}$ (e.g. an upper end thereof shown in FIG. 3). In another example, the inductor L1 may be coupled to the input terminals of the PGA 160, and the inductor L2 may be coupled to the output terminals of the up-converting core circuit 151 via the second end of the sub-inductor $L2_{N1}$ and the second end of the sub-inductor $L2_{P1}$.

In one embodiment, the transformer load 162 shown in FIG. 2 may be implemented by the transformer load 300. For example, the inductor L1 may be coupled to the output terminals of the amplifier core circuit 161, and the inductor L2 may be coupled to the input terminals of the PAD 170 via the second end of the sub-inductor $L2_{N1}$ and the second end of the sub-inductor $L2_{P1}$. In another example, the inductor L1 may be coupled to the input terminals of the PAD 170, and the inductor L2 may be coupled to the output terminals of the amplifier core circuit 161 via the second end of the sub-inductor $L2_{N1}$ and the second end of the sub-inductor $L2_{P1}$.

The transformer load 300 shown in FIG. 3 illustrates the mode switching of two modes (e.g. the first mode and the second mode). In some embodiment, the inductor L2 of the transformer load 300 may further comprise other sub-inductors and switches to make the inductor L2 have three or more different candidate inductances when the multi-band transceiver 10 has three or more modes for three or more different frequency bands. Those skilled in this art should understand how to design the transformer load 300 supporting three or more different frequency bands according to the embodiment of FIG. 3, and related details are omitted here for brevity.

Figure 4:
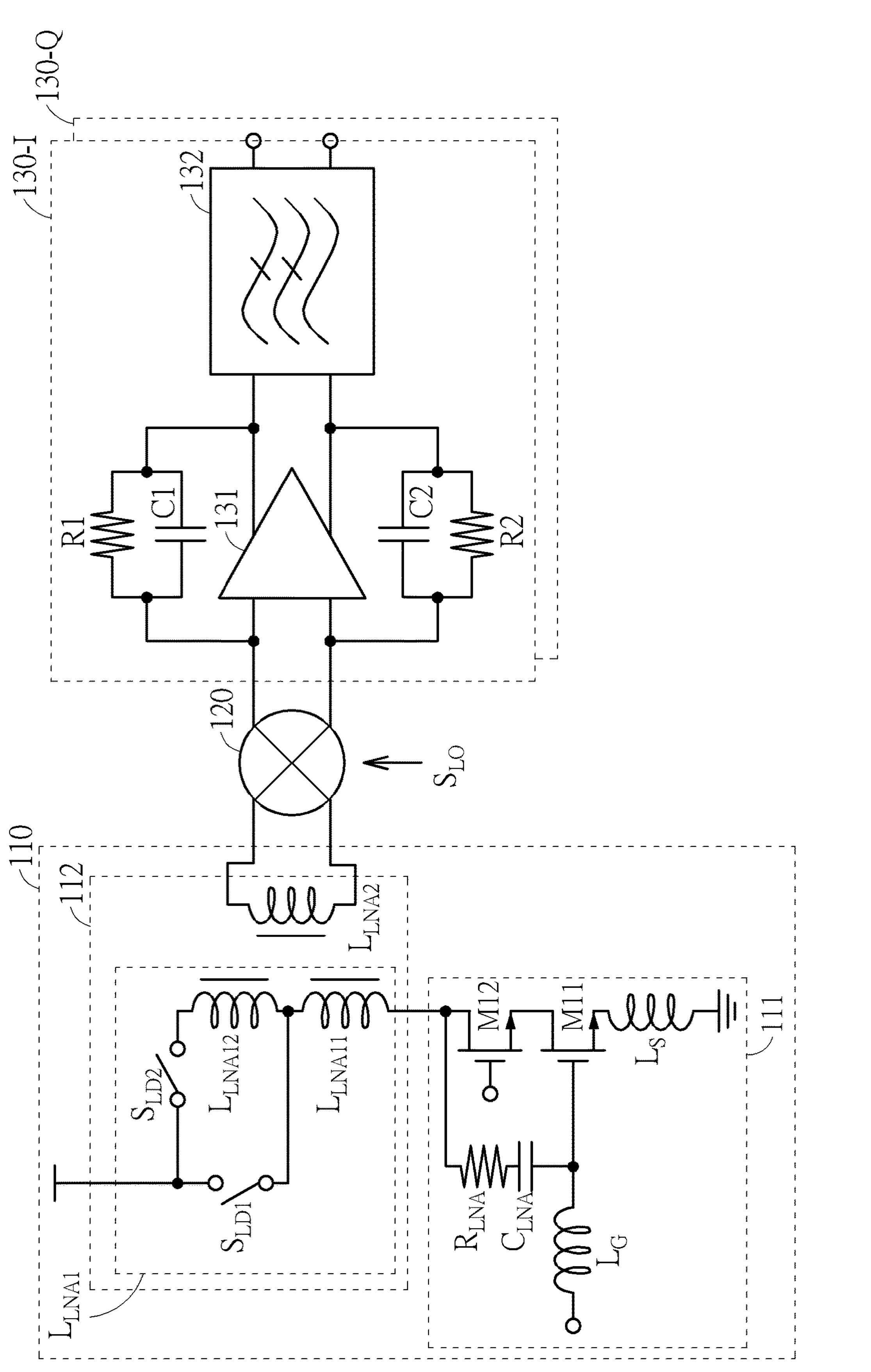
FIG. 4 is a diagram illustrating details of some sub-circuits of a receiving path of the RF front-end circuit shown in FIG. 1 according to an embodiment of the present invention.

FIG. 4 is a diagram illustrating details of some sub-circuits (e.g. the LNA 110, the down-converting mixer 120 and the baseband circuit 130) of the receiving path of the RF front-end circuit 100 shown in FIG. 1 according to an embodiment of the present invention. In this embodiment, the baseband circuit 130 may comprise an in-phase-channel (I-channel) baseband circuit 130-I and a quadrature-channel (Q-channel) baseband circuit 130-Q, where each of the I-channel baseband circuit 130-I and the Q-channel baseband circuit 130-Q may comprise a channel filter (which is formed by an operational amplifier 131, resistors R1 and R2, and capacitors C1 and C2) and a low pass filter 132. The channel filter (which is formed by the operational amplifier 131, the resistors R1 and R2, and the capacitors C1 and C2) and the low pass filter 132 should be well known by those skilled in this art, and will not be described in detail here for brevity. In addition, the LNA 110 may comprise an amplifier core circuit 111 and a transformer load 112. The amplifier core circuit 111 may comprise an input transistor such as an N-type transistor M11, a cascaded transistor such as an N-type transistor M12, an input inductor such as an inductor $L_G$, a source inductor such as an inductor $L_S$, a feedback resistor such as a resistor $R_{LNA}$ and a feedback capacitor such as a capacitor $C_{LNA}$.

In this embodiment, the transformer load 112 may comprise a first inductor such as an inductor $L_{LNA1}$ and a second inductor such as an inductor $L_{LNA2}$. The inductor $L_{LNA1}$ is coupled to an output terminal of the amplifier core circuit 111 (e.g. a drain electrode of the transistor M12), and the inductor $L_{LNA2}$ is coupled to input terminals of the down-converting mixer 120, where the inductor $L_{LNA1}$ may be a switchable inductor. For example, the inductor $L_{LNA1}$ may comprise a first sub-inductor such as a sub-inductor $L_{LNA11}$, a first switch such as a switch $S_{LD1}$, a second sub-inductor such as a sub-inductor $L_{LNA12}$, and a second switch such as a switch $S_{LD2}$. A first end of the sub-inductor $L_{LNA11}$ (e.g. a lower end thereof shown in FIG. 4) is coupled to the output terminal of the amplifier core circuit 111 (e.g. the drain electrode of the transistor M12), and a first end of the sub-inductor $L_{LNA12}$ (e.g. a lower end thereof shown in FIG. 4) is coupled to a second end of the sub-inductor $L_{LNA11}$ (e.g. an upper end thereof shown in FIG. 4). The switch $S_{LD1}$ is coupled between a reference voltage (e.g. a supply voltage) and the second end of the sub-inductor $L_{LNA11}$, and the switch $S_{LD2}$ is coupled between the reference voltage (e.g. the supply voltage) and a second end of the sub-inductor $L_{LNA12}$. When the multi-band transceiver 10 is set to operate in the first mode, the switch $S_{LD1}$ is turned off and the switch $S_{LD2}$ is turned on, making $L_{LNA1}=L_{LNA11}+L_{LNA12}$. When the multi-band transceiver 10 is set to operate in the second mode, the switch $S_{LD1}$ is turned on and the switch $S_{LD2}$ is turned off, making $L_{LNA1}=L_{LNA11}$.

The transformer load 112 shown in FIG. 4 illustrates the mode switching of two modes (e.g. the first mode and the second mode). In some embodiment, the inductor $L_{LNA1}$ of the transformer load 112 may further comprise other sub-inductors and switches to make the inductor $L_{LNA1}$ have three or more different candidate inductances when the multi-band transceiver 10 has three or more modes for three or more different frequency bands. Those skilled in this art should understand how to design the transformer load 112 supporting three or more different frequency bands according to the embodiment of FIG. 4, and related details are omitted here for brevity.

To summarize, the multi-band transceiver 10 (e.g. the RF front-end circuit 100 therein) can make any or each of the LNA 110, the up-converting mixer 150 and the PGA 160 comprises a switchable transformer load (e.g. a transformer load which comprises at least one switchable inductor), to allow the LNA 110, the up-converting mixer 150 and the PGA 160 properly operate in different modes of the multi-band transceiver 10. Thus, the embodiment of the present invention does not need to implement separated LNAs, up-converting mixers and/or PGAs for different modes, and an overall circuit area can be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A radio frequency (RF) front-end circuit of a wireless communication device, comprising:

a receiving amplifier, configured to amplify a RF received signal to generate an amplified received signal;

a down-converter, coupled to the receiving amplifier, configured to down-convert the amplified received signal according to a local oscillation (LO) signal to generate a down-converted received signal;

an up-converter, configured to up-convert a transmitted signal according to the LO signal to generate an up-converted transmitted signal;

a transmitting amplifier, coupled to the up-converter, configured to amplify the up-converted transmitted signal to generate an amplified transmitted signal; and an output driver, coupled to the transmitting amplifier, configured to output a driving transmitted signal according to the amplified transmitted signal;

wherein at least one of the receiving amplifier, the up-converter and the transmitting amplifier comprises a transformer load, and the transformer load comprises a switchable inductor; when the wireless communication device is set to operate in a first mode, the LO signal is set to have a first frequency, and the switchable inductor is set to have a first inductance; and when the wireless communication device is set to operate in a second mode, the LO signal is set to have a second frequency, and the switchable inductor is set to have a second inductance; the switchable inductor comprises:

a first negative sub-inductor;

a first positive sub-inductor;

a second negative sub-inductor, wherein a first end of the second negative sub-inductor is coupled to the first negative sub-inductor;

a second positive sub-inductor, wherein a first end of the second positive sub-inductor is coupled to the first positive sub-inductor;

a first negative switch, coupled between the first end of the second negative sub-inductor and a reference voltage;

a first positive switch, coupled between the first end of the second positive sub-inductor and the reference voltage;

a second negative switch, coupled between a second end of the second negative sub-inductor and the reference voltage; and a second positive switch, coupled between a second end of the second positive sub-inductor and the reference voltage;

wherein:

when the wireless communication device is set to operate in the first mode, the first negative switch and the first positive switch are turned off, and the second negative switch and the second positive switch are turned on; and when the wireless communication device is set to operate in the second mode, the first negative switch and the first positive switch are turned on, and the second negative switch and the second positive switch are turned off.

2. The RF front-end circuit of claim 1, wherein the up-converter comprises the transformer load, and the transformer load comprises:

a first inductor, coupled to output terminals of an up-converting core circuit of the up-converter; and a second inductor, coupled to input terminals of the transmitting amplifier;

wherein one of the first inductor and the second inductor represents the switchable inductor.

3. The RF front-end circuit of claim 1, wherein the transmitting amplifier comprises the transformer load, and the transformer load comprises:

a first inductor, coupled to output terminals of an amplifier core circuit of the transmitting amplifier; and a second inductor, coupled to input terminals of the output driver;

wherein one of the first inductor and the second inductor represents the switchable inductor.

4. The RF front-end circuit of claim 1, wherein the output driver comprises:

a transconductance stage, configured to receive the amplified transmitted signal from the transmitting amplifier;

a first output stage, coupled to the transconductance stage, configured to output a first driving transmitted signal according to the amplified transmitted signal when the wireless communication device is set to operate in the first mode; and a second output stage, coupled to the transconductance stage, configured to output a second driving transmitted signal according to the amplified transmitted signal when the wireless communication device is set to operate in the second mode;

wherein the driving transmitted signal comprises the first driving transmitted signal and the second driving transmitted signal.

5. The RF front-end circuit of claim 1, wherein the receiving amplifier comprises the transformer load, and the transformer load comprises:

a first inductor, coupled to an output terminal of an amplifier core circuit of the receiving amplifier; and a second inductor, coupled to input terminals of the down-converter;

wherein the first inductor represents the switchable inductor.

6. A radio frequency (RF) front-end circuit of a wireless communication device, comprising:

an up-converter, configured to up-convert a transmitted signal according to a local oscillation (LO) signal to generate an up-converted transmitted signal;

a transmitting amplifier, coupled to the up-converter, configured to amplify the up-converted transmitted signal to generate an amplified transmitted signal; and an output driver, coupled to the transmitting amplifier, configured to output a driving transmitted signal according to the amplified transmitted signal;

wherein at least one of the up-converter and the transmitting amplifier comprises a transformer load, and the transformer load comprises a switchable inductor; when the wireless communication device is set to operate in a first mode, the LO signal is set to have a first frequency, and the switchable inductor is set to have a first inductance; and when the wireless communication device is set to operate in a second mode, the LO signal is set to have a second frequency, and the switchable inductor is set to have a second inductance; the switchable inductor comprises:

a first negative sub-inductor;

a first positive sub-inductor;

a second negative sub-inductor, wherein a first end of the second negative sub-inductor is coupled to the first negative sub-inductor;

a second positive sub-inductor, wherein a first end of the second positive sub-inductor is coupled to the first positive sub-inductor;

a first negative switch, coupled between the first end of the second negative sub-inductor and a reference voltage;

a first positive switch, coupled between the first end of the second positive sub-inductor and the reference voltage;

a second negative switch, coupled between a second end of the second negative sub-inductor and the reference voltage; and a second positive switch, coupled between a second end of the second positive sub-inductor and the reference voltage;

wherein:

when the wireless communication device is set to operate in the first mode, the first negative switch and the first positive switch are turned off, and the second negative switch and the second positive switch are turned on; and when the wireless communication device is set to operate in the second mode, the first negative switch and the first positive switch are turned on, and the second negative switch and the second positive switch are turned off.

7. The RF front-end circuit of claim 6, wherein the up-converter comprises the transformer load coupled to output terminals of an up-converting core circuit of the up-converter, and the transformer load comprises:

a first inductor, coupled to the output terminals of the up-converting core circuit; and a second inductor, coupled to input terminals of the transmitting amplifier;

wherein one of the first inductor and the second inductor represents the switchable inductor.

8. The RF front-end circuit of claim 6, wherein the transmitting amplifier comprises the transformer load coupled to output terminals of an amplifier core circuit of the transmitting amplifier, and the transformer load comprises:

a first inductor, coupled to the output terminals of the amplifier core circuit; and a second inductor, coupled to input terminals of the output driver;

wherein one of the first inductor and the second inductor represents the switchable inductor.

9. The RF front-end circuit of claim 6, wherein the output driver comprises:

a transconductance stage, configured to receive the amplified transmitted signal from the transmitting amplifier;

a first output stage, coupled to the transconductance stage, configured to output a first driving transmitted signal according to the amplified transmitted signal when the wireless communication device is set to operate in the first mode; and a second output stage, coupled to the transconductance stage, configured to output a second driving transmitted signal according to the amplified transmitted signal when the wireless communication device is set to operate in the second mode;

wherein the driving transmitted signal comprises the first driving transmitted signal and the second driving transmitted signal.

10. A radio frequency (RF) front-end circuit of a wireless communication device, comprising:

a receiving amplifier, configured to amplify a RF received signal to generate an amplified received signal; and a down-converter, coupled to the receiving amplifier, configured to down-convert the amplified received signal according to a local oscillation (LO) signal to generate a down-converted received signal;

wherein the receiving amplifier comprises a transformer load, and the transformer load comprises a switchable inductor; when the wireless communication device is set to operate in a first mode, the LO signal is set to have a first frequency, and the switchable inductor is set to have a first inductance; and when the wireless communication device is set to operate in a second mode, the LO signal is set to have a second frequency, and the switchable inductor is set to have a second inductance; the switchable inductor comprises:

a first negative sub-inductor;

a first positive sub-inductor;

a second negative sub-inductor, wherein a first end of the second negative sub-inductor is coupled to the first negative sub-inductor;

a second positive sub-inductor, wherein a first end of the second positive sub-inductor is coupled to the first positive sub-inductor;

a first negative switch, coupled between the first end of the second negative sub-inductor and a reference voltage;

a first positive switch, coupled between the first end of the second positive sub-inductor and the reference voltage;

a second negative switch, coupled between a second end of the second negative sub-inductor and the reference voltage; and a second positive switch, coupled between a second end of the second positive sub-inductor and the reference voltage;

wherein:

when the wireless communication device is set to operate in the first mode, the first negative switch and the first positive switch are turned off, and the second negative switch and the second positive switch are turned on; and when the wireless communication device is set to operate in the second mode, the first negative switch and the first positive switch are turned on, and the second negative switch and the second positive switch are turned off.

11. The RF front-end circuit of claim 10, wherein the transformer load comprises:

a first inductor, coupled to an output terminal of an amplifier core circuit of the receiving amplifier; and a second inductor, coupled to input terminals of the down-converter;

wherein the first inductor represents the switchable inductor.

* * * * *